Dec. 19, 1950 C. E. WYRICK 2,534,333

TURRET

Filed April 13, 1945 9 Sheets-Sheet 1

INVENTOR
CLAYTON E. WYRICK
BY
Toulmin & Toulmin
ATTORNEY

Dec. 19, 1950 C. E. WYRICK 2,534,333

TURRET

Filed April 13, 1945 9 Sheets-Sheet 2

INVENTOR
CLAYTON E. WYRICK
BY
Toulmin & Toulmin
ATTORNEY

Dec. 19, 1950 C. E. WYRICK 2,534,333

TURRET

Filed April 13, 1945 9 Sheets-Sheet 3

INVENTOR
CLAYTON E. WYRICK,
BY
Toulmin & Toulmin
ATTORNEYS

TURRET

Filed April 13, 1945

INVENTOR
CLAYTON E. WYRICK
BY
Toulmin & Toulmin
ATTORNEYS

TURRET

INVENTOR
CLAYTON E. WYRICK
BY
Toulmin & Toulmin
ATTORNEY

TURRET

INVENTOR
CLAYTON E. WYRICK
BY
Toulmin & Toulmin
ATTORNEY

Dec. 19, 1950 C. E. WYRICK 2,534,333

TURRET

Filed April 13, 1945 9 Sheets-Sheet 7

INVENTOR
CLAYTON E. WYRICK
BY
Toulmin & Toulmin
ATTORNEYS

INVENTOR
CLAYTON E. WYRICK
BY
Toulmin & Toulmin
ATTORNEYS

INVENTOR
CLAYTON E. WYRICK
BY
Toulmin & Toulmin
ATTORNEYS

Patented Dec. 19, 1950

2,534,333

UNITED STATES PATENT OFFICE 2,534,333

TURRET

Clayton Earl Wyrick, Miami, Fla., Mary R. Wyrick, executrix of said Clayton E. Wyrick, deceased, assignor to Hopkins-Wyrick Laboratories, Inc., Miami, Fla., a corporation of Florida Application April 13, 1945, Serial No. 588,179

7 Claims. (Cl. 29—49)

This invention relates to machine tools, and particularly to a machine tool of the turret type that is adapted to be mounted upon the compound slide of a lathe.

An object of the invention is to provide an improved turret that is adapted to be mounted upon the compound slide of an engine lathe in such a manner that it is rigidly secured upon the compound slide, and which is constructed in such a manner that tools carried by the turret can be accurately and conveniently indexed into work operating position.

Another object of the invention is to provide a turret that is constructed and arranged in such a manner that it can carry tools that are adapted to work on the center line of the spindle of the machine or tools that are adapted to work below the center line of the spindle of the machine and can index either of the tools into proper work relationship with respect to the spindle of the machine.

Still another object of the invention is to provide a turret that is adapted to index the tools radially with respect to the spindle of the machine in order to very accurately position the work tools relative to the center line of the spindle of the machine.

It is another object of the invention to provide an indexing mechanism for a turret wherein certain tools carried by the turret can be indexed to a position wherein the center line of the tool is on the center line of the spindle of the machine, such as knurling and drilling tools, and other tools carried by the turret can be indexed so that they are disposed below the center line of the spindle of the machine and can thus approach the center line of the spindle at an angle, such as tool bits for producing turning operations.

Another object of the invention is to provide a turret for carrying a plurality of tools in accordance with the foregoing object wherein any station on the turret can be adjusted to receive either type of tool for working on center or below center of the spindle of the machine.

Another object of the invention is to provide a turret that is adapted to be mounted upon the compound slide of an engine lathe that is constructed and arranged in a manner to receive tool holders that are interchangeably received in any of the tool stations on the turret, and which can be removed and be replaced by other tools without affecting the position of any of the tools retained on the turret, each of the tool holders being individually adjustable upon the turret to position the tool carried thereby in a proper work operation relationship with respect to the center line of the spindle of the machine.

It is another object of the invention to provide a turret in accordance with the foregoing object wherein any tool, particularly tool bits, can be removed from the turret for grinding and be returned to the turret and be adjusted relative to the turret and the remaining tools on the turret so that the newly sharpened bit will be positioned in the same radial position it occupied before removal for regrinding.

It is another object of the invention to provide a turret adapted for use on an engine lathe wherein both radial and end cutting tools can be carried for alternately producing radial or end turning operations wherein the turret is provided with means for positioning the various tools in proper relationship relative to the center line of the spindle of the machine for producing either radial or end turning operations.

It is still another object of the invention to provide a turret that is adapted to be mounted upon the compound slide of an engine lathe and that is constructed and arranged in a manner that it can carry tools for producing both radial and end operations so that either type of operation can be produced by movement of the compound slide and thus obtain both radial and end operations under machine feed of the compound slide.

Another object of the invention is to provide an improved mounting means for a turret upon a support member so that a single operation of an indexing lever will release the turret from the support means and index the tools carried thereon into an accurate operating relationship relative to the spindle of the machine with which the turret is associated.

Another object of the invention is to provide an index button for each of the tools carried upon the turret that is selectively adaptable to stop the indexing of the turret in such a manner that the top surface of a cutting bit will be positioned below the center of the spindle so that the cutting point of the bit approaches the horizontal spindle center at an angle in order to provide top rake on the bit and will stop indexing of the turret so that end cutting tools may be positioned on spindle center.

Another object of the invention is to provide an improved indexing mechanism for a turret wherein by rotation of a single lever an index locking means will be unlocked while the turret is being released from its support so that it can be subsequently indexed to the next tool position and be subsequently locked in the position, all of which operation is performed by a single movement of the indexing lever.

Another object of the invention is to provide a turret that is supported upon a tapered member, and is provided with a locking means that insures the same degree of tightness of the turret upon the tapered member each time the turret is indexed to a new position.

It is another object of the invention to provide means for changing the degree of tightness with which the turret is supported upon the tapered member that carries the same.

It is another object of the invention to provide a turret for use on an engine lathe that is constructed and arranged in accordance with any of the foregoing objects wherein the turret is adapted to be mounted upon the compound slide of an engine lathe or upon a support member that is coaxial with the spindle of the lathe, and which can be indexed for producing either radial or end operations selectively in accordance with the mounting position of the turret upon the compound slide of the lathe or upon the support member that is coaxial with the spindle of the lathe.

Another object of the invention is to provide an improved indexing mechanism for a turret wherein means is provided for locking the indexing bolt in an unlocked position until the turret has passed through a portion of the indexing movement, at which time the indexing bolt can be released to permit the same to engage the next locking position of the turret.

Still another object of the invention is to provide a turret that is constructed and arranged in such a manner that it is removably mounted upon a support member so that the turret together with the machine tools carried thereby can be removed from the mounting member and be replaced by another turret carrying a different tool set-up, thus providing an apparatus whereby tooling set-ups on turrets need not be changed for short run production of parts.

Further objects and advantages will become apparent from the drawings and the following description.

Figure 1:
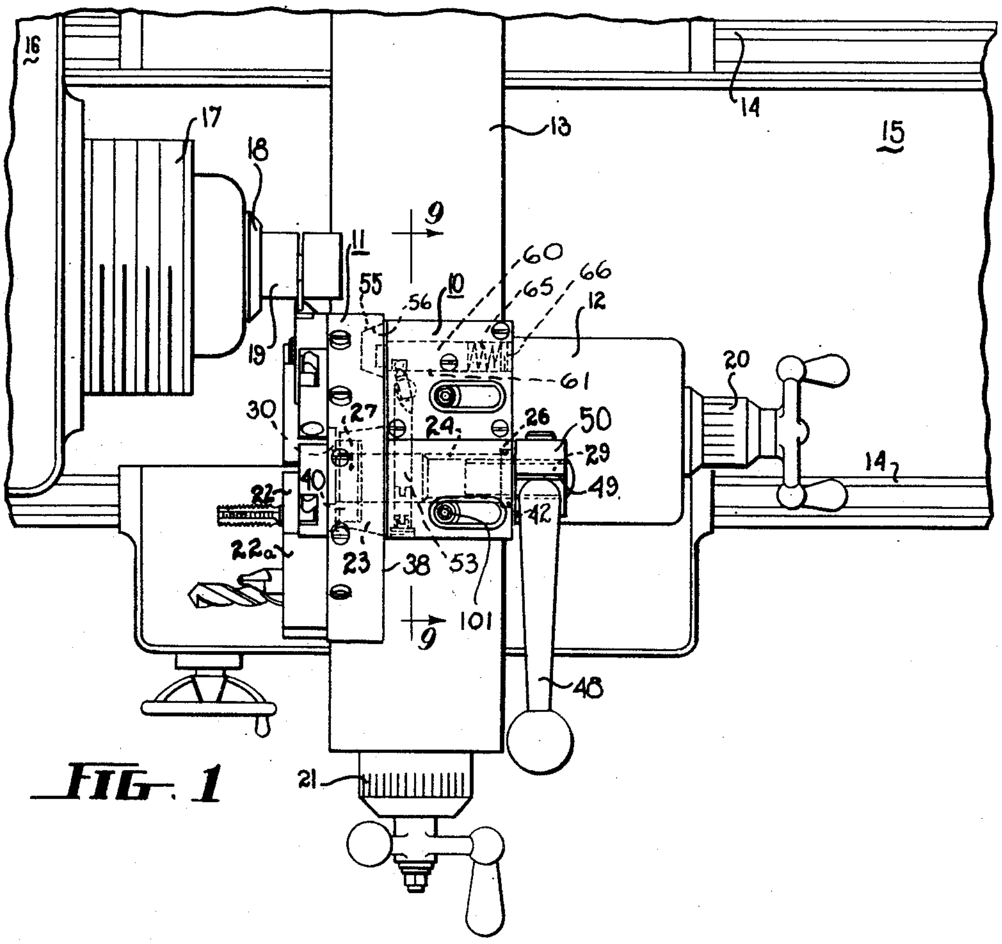
Figure 1 is a plan view of a portion of a lathe showing the turret tool of this invention mounted thereon.
Figure 2:
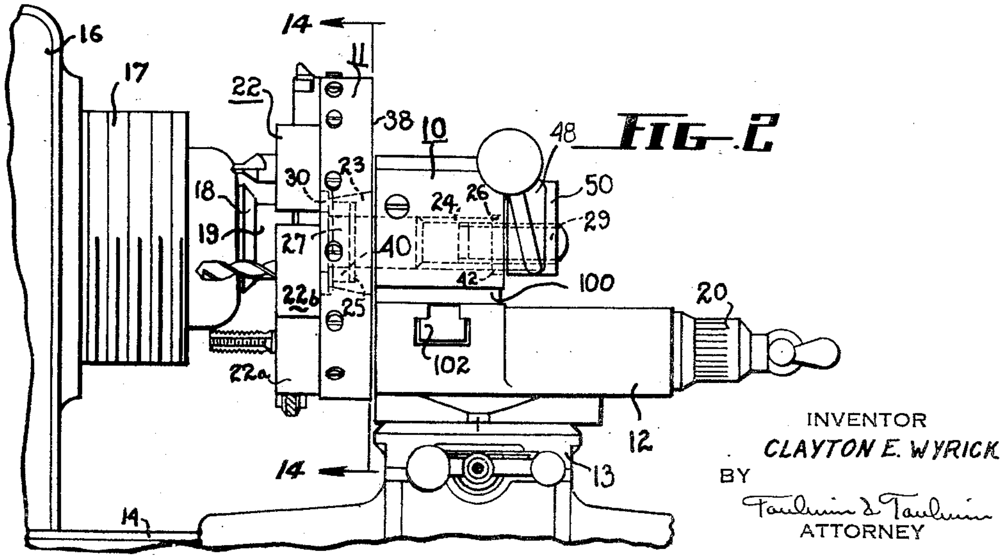
Figure 2 is a side elevational view of the lathe illustrated in Figure 1.

In this invention the turret tool consists of a support block 10 that carries a turret disc 11 that is rotatably mounted upon a horizontal axis of rotation upon the support block in a manner hereinafter described. The support block is adapted to be mounted upon the compound slide 12 of an engine lathe that in turn is supported upon the cross slide 13 carried by the V-ways 14 of the lathe bed 15. The cross slide 13 is adapted to be moved longitudinally along the ways 14 by suitable and conventional power means which may consist of the lead screw or the feed rod of the lathe. The lathe bed 15 supports a headstock 16 having a spindle 17. A suitable chuck 18 carries a work piece 19.

The compound slide 12 is moved longitudinally of the lathe bed 15 by means of the usual micrometer feed control means 20 while the cross slide 13 is moved transversely of the lathe bed 15 by means of the micrometer feed control means 21. The lathe illustrated in Figure 1 is thus a conventional apparatus upon which the turret tool of this invention can be used.

The turret disc 11 supports a plurality of tool holders 22 that receive various types of tools so that a tooling set-up can be arranged upon the turret disc for performing various operations upon the work piece 19 when the tools are brought into work relationship with the work piece 19 as indexed by the turret disc. The tool holders 22*a* carry the usual type of tool bit for performing various turning operations while the tool holders 22*b* support tools that are provided for end operations upon the work piece 19, such as drilling and boring, and thus require the tools to be placed coaxial with the center of the spindle 17. Also, the tool holder 22*c* carries a knurling tool and is, therefore, to be positioned on the horizontal center line of the lathe. As is conventional, the tool bits in the tool holders 22*a* are adapted to have their top edges positioned below the horizontal center line of the spindle of the lathe so that they will approach the horizontal center line at an angle to provide the necessary top rake. All of the foregoing tools may operate upon the work piece 19 during a complete cycle of the rotation of the disc 11, or may be individually selected for operation upon the work piece 19 and they will each be positioned in proper work relationship with respect to the work piece 19 either on horizontal center or below horizontal center thereof in a manner to be hereinafter described.

It will thus be seen that with the turret disc 11 being mounted upon the compound slide 12 that either radial or end turning operations can be performed from the compound slide under machine feed.

The support block 10 for the turret disc 11 is a substantially rectangular block having a tapered nose portion that extends from one vertical face of the block 10. The tapered nose portion 23 is tapered at an angle at approximately 7° to provide a sticking taper upon which a turret disc 11 is drawn by means hereinafter described. A horizontal bore 24 extends through the support block 10 and has an enlarged coaxial recess 25 at one end of the bore 24 and a somewhat smaller coaxial recess 26 at the opposite end of the bore 24, see Figure 7.

A shaft 27 extends through the bore 24 in the body 10 and has a head 28 on one end thereof and a threaded shank 29 on the opposite end. A hub member 30 is carried upon the shaft 27 and has a circular boss 31 adapted to rotatably slide within the recess 25 in the block 12. The hub 30 has a radial flange 32 that has screws 33 extending therethrough into threaded engagement with a second hub member 34 that has an internally tapered surface 35 adapted to co-operate with the tapered nose 23 on the block 10. The hub member 34 has a radial flange 36 that rests within a recess 37 provided in the rear face 38 of the turret disc 11. Bolts 39 extend through the turret disc 11 into threaded engagement with the radial flange 36 whereby to hold the turret disc upon the hub members 30, 34, see Figure 7. Thus, upon removal of the bolts 39 the turret disc 11 together with the tool holders 22 carried thereby may be removed from the support block so that another and similar turret disc 11 having a different tooling set-up thereon can be positioned on the support block 10 and thus produce a different type of work piece in the lathe.

The shaft 27 carries a collar 40 that is pinned thereto by means of the pin 41, which collar is adapted to engage the boss 31 to urge the tapered surface 35 off of the tapered nose 23 when the shaft 27 is moved axially, the turret disc 11 being supported during this axial movement by the boss 31, which also supports the turret during subsequent indexing movement hereinafter described.

The threaded end 29 of the shaft 27 extends through and is in engagement with a threaded nut 42 that has annular recesses 43 therein. The recesses 43 have a tapered forward face 44 that is engaged by the tapered end of the set screws 45. Inward movement of the set screws 45 causes the radial flange 46 on the nut 42 to be drawn against the bottom of the recess 26 and thereby position the nut 42 in a predetermined position in the bore 24. The nut 42 is provided with a slot 47 through one-half thereof whereby tightening of the set screws 45 inwardly causes the internal thread in the nut 42 to closely engage the threaded end 29 of the shaft 27 and thereby substantially eliminate any play between these two elements.

A handle 48 is threaded upon the threaded portion 29 of the shaft 27 and has a slot 49 therein which permits tightening of the handle boss 50 upon the threaded portion 29 of the shaft 27 and thereby prevents rotation of the handle 48 relative to the shaft 27.

In the apparatus thus far described it will be apparent that the hub 30, 34 of the turret disc 11 is reciprocable axially upon the nose 23 of the support block 10 to alternately release and secure the turret disc 11 thereon. When the handle 48 is rotated in a counterclockwise direction, as viewed in Figures 1 and 7, the shaft 27 is moved in a leftward direction to release the tapered surface 35 of the hub 30, 34 from the tapered surface of the nose 23 so that the turret 11 can be rotated upon the boss 31, it being noted that the tapered surfaces do not support the turret disc 11. When the handle 48 is rotated in the reverse direction the turret disc 11 will be secured upon the nose member 23. The handle 48 can be rotated in a clockwise direction only to a preedtermined degree in a manner hereinafter described, whereby to cause the surface 35 of the hub 30, 34 to bind upon the tapered nose 23 with a predetermined degree of friction which will be sufficient to prevent rotation of the turret disc during work operations.

To adjust the friction applied upon the sticking taper heretofore referred to, the nut 42 can be rotated slightly after the set screws 45 have been released therefrom thus axially shifting the position of the hub 30, 34 relative to the nose 23 of the support block 10. By rotating the nut 42 in one direction the hub 30, 34 will not pull upon the nose 23 quite so tightly while rotation in the opposite direction would reverse the situation. After the desired degree of tightness has been obtained upon the sticking taper the set screws 45 would be tightened.

Figures 5, 8:
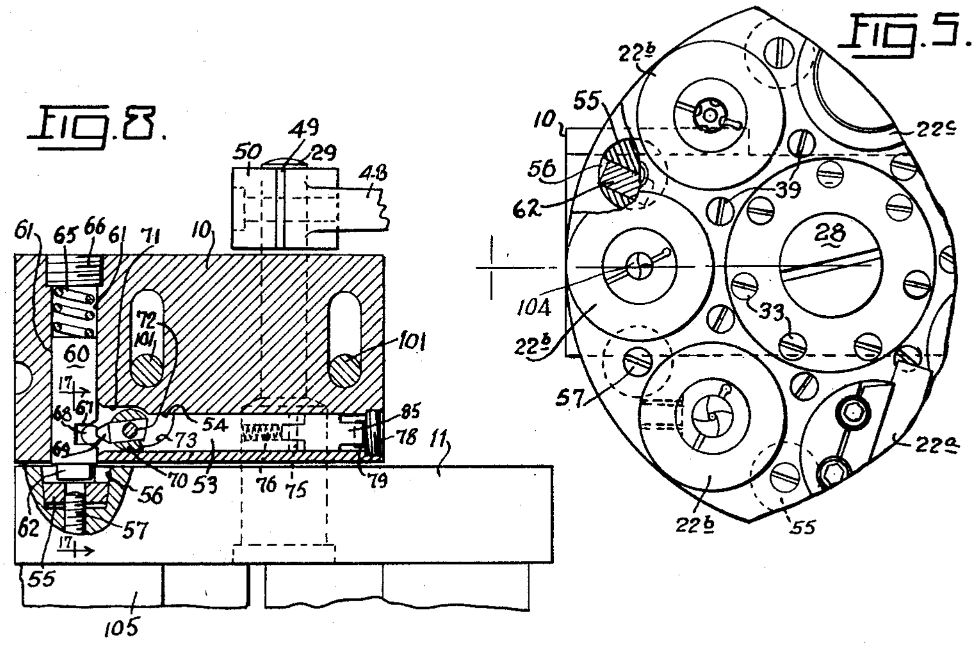
Figure 5 is a front elevational view of a portion of the turret illustrating the position of the index button for positioning a tool on the horizontal center of the spindle of the lathe.
Figure 8 is a horizontal cross sectional view taken along line 8—8 of Figure 9.
Figure 9:
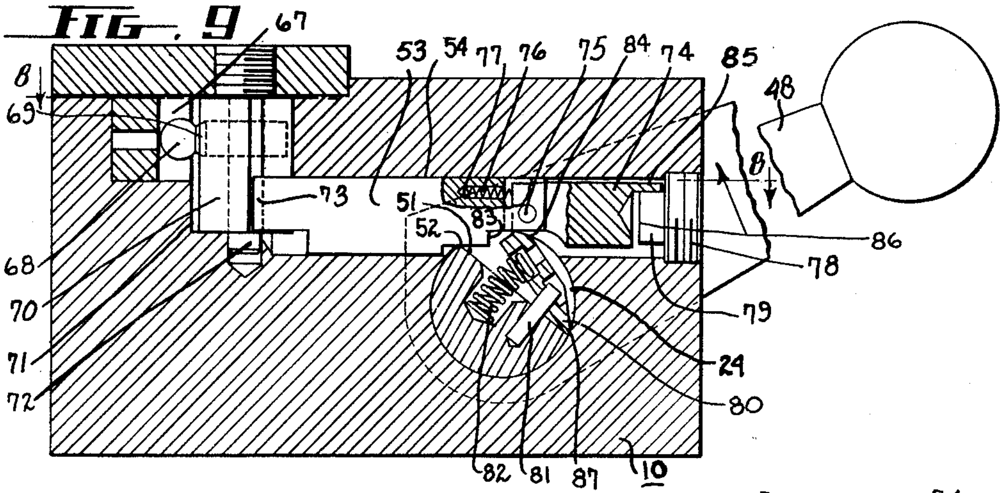
Figure 9 is a vertical cross sectional view taken along line 9—9 of Figure 1 illustrating the indexing and locking means.
Figure 17:
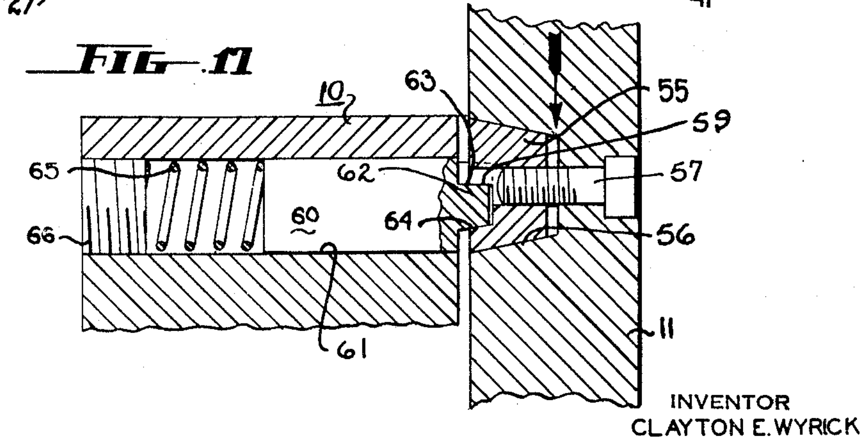
Figure 17 is a vertical cross sectional view of the indexing bolt taken along line 17—17 of Figure 8.

In order to control the degree of clockwise rotation of the shaft 27 and thus control the tightness of the turret disc 11 upon he nose 23, the shaft 27 has a slot 51 cut transversely therein, see Figure 9, thereby providing a corner edge 52 that engages an index bolt operating bolt 53 that is positioned within the support block 10 transversely to the shaft 27 and within a bore 54. When the turret disc 11 is being drawn upon the nose 23, the bolt 53 will be in position, as illustrated in Figure 9, so that the clockwise rotation of the handle 48 will cause the edge 52 to engage the bolt 53 and thus limit the rotation of the handle 48. The indexing mechanism for the turret disc 11 includes an index button 55 that has a tapered external surface that engages the tapered side walls of a recess 56 provided in the rear face 38 of the turret disc 11. A screw 57 extends through the turret disc 11 from the front face 58 of the turret disc 11 to retain the index button 55 in the recess 56. It will be noted in Figures 3, 5 and particularly in Figure 14 that there is provided an index button 55 adjacent each of the tool holders 22. Each of the index buttons 55 has a transverse slot 59 therein that has the longitudinal center line thereof off-set from the axis of rotation of the button. This transverse recess 59 in the index buttons 55 is engaged by an index bolt 60, see Figure 8, that is slidably carried in a bore 61 extending transversely through the support block 10. The nose 62 of the index bolt 60 is provided with a flat surface 63 on one side thereof and a tapered surface 64 on the opposite side thereof, see Figure 17. Thus, when the turret disc 11 is rotated in the direction of the arrow, indicated on Figure 17, the upper surface 63 will co-operate with the upper edge of the slot 56 in the index button 55 to stop rotation of the turret in an accurate position. The spring 65 disposed between the index bolt 60 and the plug 66 urges the bolt 60 into engagement with the index button 55.

Figures 10, 11:
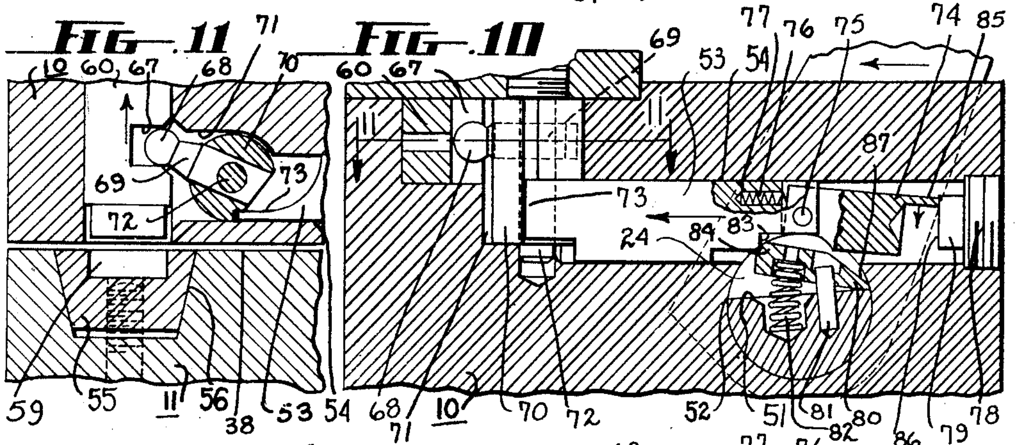
Figure 10 is a cross sectional view similar to Figure 9 but illustrating the position of the locking bolt for the indexing bolt to lock the same in unlocked position.
Figure 11 is a horizontal cross sectional view taken along line 11—11 of Figure 10 illustrating the position of the indexing bolt as positioned according to the mechanism illustrated in Figure 10.
Figures 12, 13:
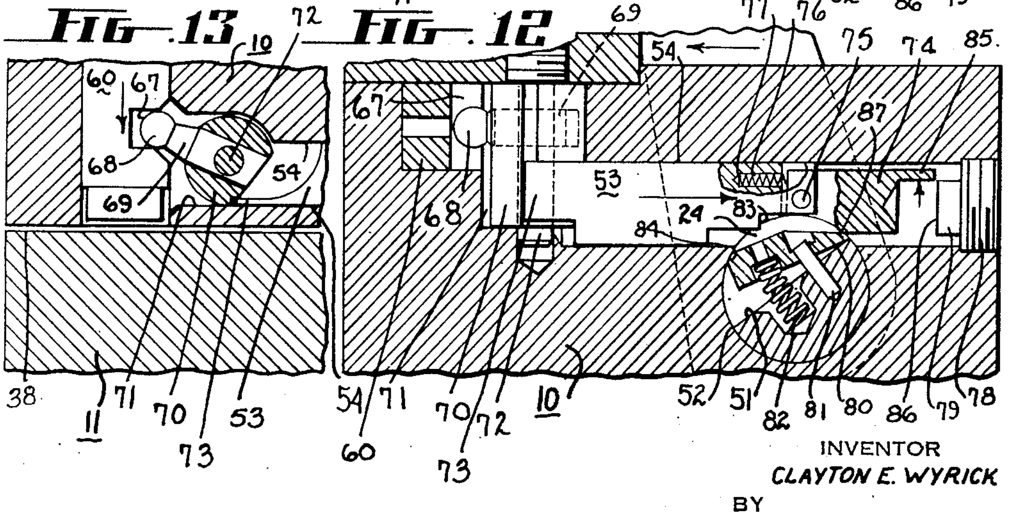
Figure 12 is a vertical cross sectional view similar to Figures 9 and 10 illustrating the locking bolt for the indexing bolt in position just after the locking bolt is released to permit return of the indexing bolt.
Figure 13 is a horizontal cross sectional view similar to Figure 11 illustrating the position of the indexing bolt at the time the apparatus of Figure 12 is in the position as illustrated.

The mechanism for releasing the index bolt 60 from the index button 55 when the turret is to be rotated consists of the release bolt 53, heretofore referred to, that is reciprocable in the bore 54, see Figures 9, 10 and 12. The index bolt 60 has a recess 67 that receives the ball-headed end 68 of an actuating member 69 that extends radially from a cylindrical member 70 disposed vertically within a chamber 71 in the support block 10, see Figures 9 and 11. A pin 72 retains the cylindrical member 70 in position in the chamber 71 so that the ball-headed end 68 of the actuating member 69 will always ride within the recess 67 in the index bolt 60.

The actuating bolt 53 is provided with an extending end 73 that engages the cylindrical member 70 to rotate the same in a clockwise direction, the spring 65 causing opposite rotation of the member 70 when the actuating bolt 53 no longer applies actuating pressure upon a cylindrical member 70.

The actuating bolt 53 has a tail member 74 that is pivotally mounted to the bolt 53 by means of a pin 75, see Figures 9, 11 and 12. This tail member 74 is engaged by a spring 76 retained within a drilled hole 77 in the bolt 53 tending to rotate the tail member 74 in a clockwise direction about the pin 75, see Figure 9. The rotation of the tail member 74 is prevented, however, by means of the plug 78 having the extending end 79 engaged by the tail member 74 as long as the handle 48 is at the position, as illustrated in Figure 9, which illuustrates the position of the index bolt releasing mechanism when the turret disc 11 is secured upon the tapered nose 23.

The actuating member for the actuating bolt 53 consists of a trip lever 80 that is disposed within the recess 51 cut transversely in the shaft 27. The trip member 80 is pivoted upon a pin 81 and is normally urged in a clockwise direction by means of the spring 82 extending between the trip member 80 and the shaft 27. The bore 24 that receives the shaft 27, however, prevents movement of the trip member 80 beyond the position, as illustrated in Figure 9.

The index bolt releasing mechanism is illustrated in operation in Figures 10 to 13, inclusive. When the handle 48 is rotated in a counterclockwise direction the trip member 80 engages a ledge 83 provided on the bolt 53 whereby to move the bolt 53 in a leftward direction, see Figure 10. Movement of the bolt 53 will continue in a leftward direction causing rotation of the members 69 and 70, see Figure 11, in a clockwise direction to withdraw the index bolt from the index button 55 until the forward edge 84 of the trip lever 80 passes beyond the ledge 83 on the bolt 53. However, before this occurs the extending end 85 on the tail member 74 will have passed over the boss 79 on the plug 78 to permit the spring 76 to rotate the tail member 74 in a clockwise direction about the pin 75 and thereby cause the extension 85 to engage the face 86 of the boss 79, as illustrated in Figure 10.

When the trip lever 80 now passes over the edge of the ledge 83 the actuating bolt 53 cannot return to the position as illustrated in Figure 9 even though the spring 65 urges the index bolt 60 in a forward direction as viewed in Figure 11.

During this interval as soon as the index bolt 60 is drawn from the index button 55 the turret disc 11 can be indexed in a manner hereinafter described. Before the indexing of the turret is complete the rear end 87 of the trip lever 80 will strike the tail member 74, as illustrated in Figure 12, and lift the tail member 74 to the position as illustrated in Figure 12. With the tail member in this position the spring 65 can urge the index bolt 60 forward until it strikes the rear face 38 of the turret disc 11 so that when the next index button aligns with the index bolt it can drop into the index slot in the index button.

Figure 3:
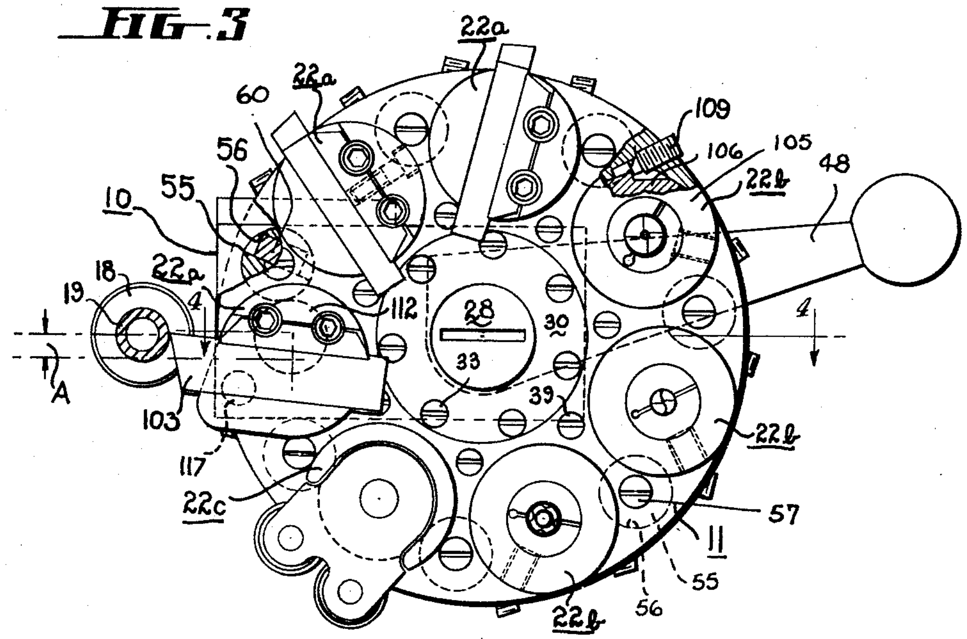
Figure 3 is a front elevational view of the turret tool.
Figures 14, 15, 16:
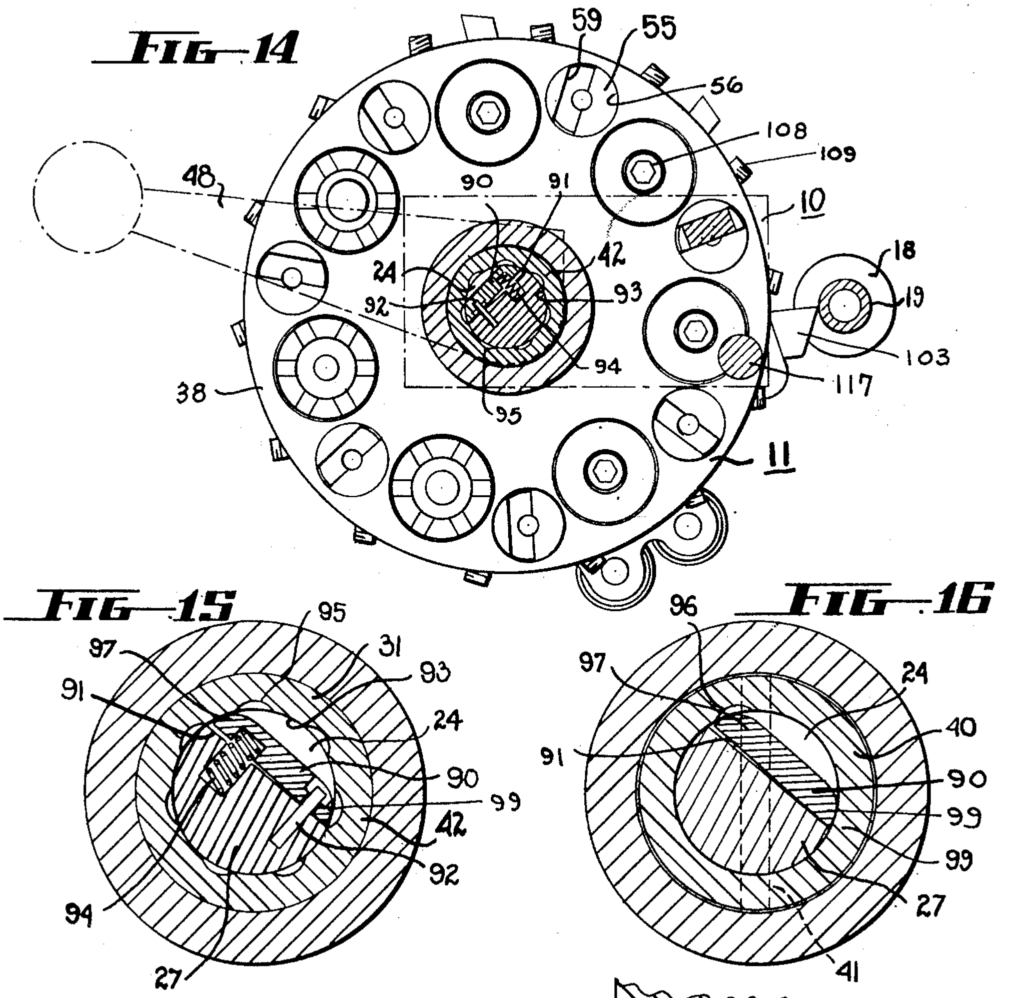
Figure 14 is a rear elevational view of the turret showing the spindle mounting means for the same in cross section and is taken along line 14—14 of Figure 2.
Figure 15 is a vertical cross sectional view of the indexing mechanism taken along line 15—15 of Figure 7.
Figure 16 is a vertical cross sectional view of the indexing mechanism taken along line 16—16 of Figure 7.

The means for indexing the turret disc 11, see Figure 15, to advance the tool holders 22 consists of a trip lever 90 that is positioned within a recess 91 extending transversely across the shaft 27 adjacent the head 28. The trip lever 90 is pivotally mounted upon a pin 92 and is spring pressed outwardly against the internal bore 93 of the boss 31 provided on the hub member 30 by means of a spring 94. The surface of the bore 93 is provided with a plurality of recesses 95 each of which corresponds to a tool holder 22, that is if the turret disc 11 is a seven place turret, as illustrated in Figures 3 and 14, then there will be seven recesses 95 provided in the bore 93 so that each tool can be indexed adjacent the work piece 19. The collar 40 pinned to the shaft 27 by means of the pin 41 is provided with a recess 96 adjacent the forward end 97 of the trip lever 90, see Figure 16.

When the turret disc 11 is to be indexed, the handle 48 will be rotated in a counterclockwise direction, as viewed in Figure 9, thereby rotating the shaft 27 in a counterclockwise direction until the forward end 97 of the trip lever 90 is positioned adjacent on the recesses 95. Figure 15 illustrates the position of the trip lever at the beginning of the indexing operation. As soon as the trip lever engages the recess to the left of the lever, as viewed in Figure 15, the hub 30, 34 will be rotated carrying the turret disc 11 therewith. This indexing motion will continue until the index bolt drops into the next succeeding index button.

Figure 7:
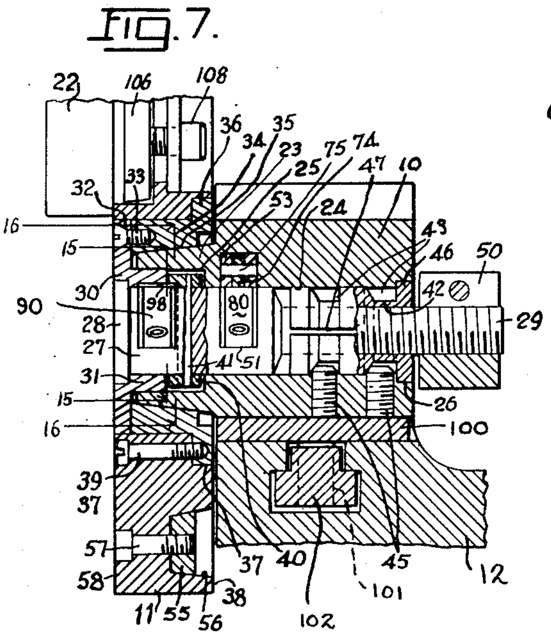
Figure 7 is a vertical cross sectional view taken along line 7—7 of Figure 4.
Figure 6:
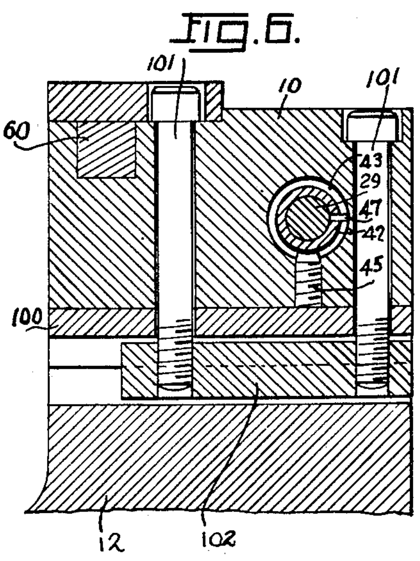
Figure 6 is a vertical cross sectional view taken along line 6—6 of Figure 4.

The collar 40 is provided with a recess 98 into which a portion of the trip lever 90 extends, as illustrated in Figure 7, whereby the heel 99 of the trip lever 90 will always ride against a smooth surface and will prevent the heel of the lever 90 from dropping into the recesses 95 during a return or tightening movement of the handle 48.

The cycle of indexing, including release of the turret from the support and unlocking of the index button is accomplished during a single forward stroke of the lever 48. Initial counterclockwise rotation of the handle 48, as viewed in Figure 9, causes the shaft 27, as viewed in Figure 7, to be moved in a leftward direction thereby releasing the hub 30, 34 of the turret disc 11 from the nose 23 of the support block 10. After the initial release movement of the turret further rotation of the handle 48 causes operation of the index bolt actuating bolt 53 as heretofore described to withdraw the index bolt 60 from the index button 55. As soon as the index bolt 60 is withdrawn from the index button 55 the trip lever 90, see Figure 15, will engage a recess 95 to produce rotation of the turret disc upon the hub 30, 34. As soon as the turret disc begins rotation, for indexing and the index button 55 that has been engaged passes by the end of the index bolt 60, the trip lever 80 will position the tail member 74 of the index bolt actuating bolt 53 as illustrated in Figure 12 so that the spring 65 can urge the index bolt 60 against the rear face 38 of the turret disc 11, whereby as soon as the next successive index button aligns with the index bolt 60, it will drop into the index slot 56 in the index button thereby stopping the turret at a proper index position. The lever 48 may then be rotated in a clockwise direction to draw the hub 30, 34 on to the tapered nose 23 and thus secure the same.

As previously referred to there is an index button 55 provided adjacent each tool holder 22. The index button associated with each of the tool holders regulates, or controls, the position of the tool carried by the tool holder relative to the horizontal axis of the spindle of the machine.

When the support block 10 is mounted upon the compound slide 12 of the lathe a shim plate 100 is positioned below the support block 10 to raise the center line of the shaft 27 to the same horizontal plane as the center line of the axis of the spindle 17 of the lathe. The bolts 101 are then threaded into engagement with a T-bar 102 to secure the support block 10 upon the compound slide 12. It will be noted that the support block 10 has a relatively large flat base surface which provides a rigid and substantial support for the support block and the turret disc carried thereby.

The index buttons 55 may be disposed in two positions, one of which is illustrated in Figure 3 and the other is illustrated in Figure 5. It will be noted that the index button 55, illustrated in Figure 3, has the index slot 56 disposed above the axis of rotation of the index button, while the index button 55, illustrated in Figure 5, has the index slot 56 thereof positioned below the axis of rotation of the index button. It will be quite apparent that with the index button positioned, as illustrated in Figure 5, that the turret disc 11 can rotate a lesser amount than when the index button is positioned as illustrated in Figure 3. Thus, when the index button 55 is positioned as illustrated in Figure 5, the axis of the tool holder 22*b* will be disposed in a horizontal plane on the center line of the axis of the spindle. Also, it will be apparent that when the index button is positioned, as illustrated in Figure 3, that the additional rotation imparted to the turret disc 11 will position the axis of the tool holder 22*a* below the horizontal plane through the axis of the spindle of the machine. The amount by which the axis of the tool holder 22*a* is positioned below the horizontal plane through the axis of the spindle of the lathe is determined by the amount by which the longitudinal center line of the slot 56 in the index button 55 is off-set from the axis of the button 55 so that the distance below center of the axis of the spindle of the lathe can be easily regulated by merely inserting index buttons having the index slots 56 thereof off-set different amounts from the axis of the buttons. The amount by which the tool holder 22*a* is positioned below the axis of the spindle of the lathe is illustrated by the dimension A.

This dimension A is precalculated so that when the tool bit 103 carried by the tool holder 22*a* is positioned with the cutting edge of the tool bit on the horizontal center of the spindle of the lathe that there will be provided the desired top rake for the tool bit without requiring any grinding of the top rake angle. Thus, the clearance angle and side rake angle of the tool bit can be refinished to sharpen the cutting edge without causing any substantial loss of material in the tool bit and without requiring the necessity for recalculation of the angle of the tool bit in view of the new grinding for obtaining a top rake angle.

The tool holder 22*b*, illustrated in Figure 5, may hold a drill or other suitable tool for an end operation upon the work piece 19. When the turret tool is indexed to position the tool holder 22*b*, as illustrated in Figure 5, it will then only be necessary to advance the turret tool transversely of the lathe bed by means of the cross slide operating member 21 to position the axis of the tool 104 coaxial with the axis of the spindle of the lathe in the work piece. It is, of course, understood that in order to eliminate any requirement that this position should be carefully calculated each time the turret is indexed that a suitable stop can be provided on the cross slide to control the transverse movement of the same to obtain this coaxial alignment of the elements.

It will thus be seen that the turret tool is constructed and arranged in a manner that either radial or end operations can be performed upon a work piece when the turret tool is mounted upon the compound slide of an engine lathe from a single turret disc. The tool holders 22 consist of a substantially cylindrical body 105 that has an extending portion 106 positioned within a recess 107 provided in the face 58 of the turret disc 11. A stud 108 extends through the turret disc 11 from the opposite side thereof into threaded engagement with the body 105 for securing the tool holder in the turret. The tool holder disclosed herein is more particularly shown and described in my copending application, Serial No. 354,084, and now Patent No. 2,368,736 granted February 6, 1945. The tool bits carried in the tool holder 22a are retained in a wedge, ledge lock construction that is more particularly disclosed and described in my aforesaid copending application. The tool holders 22 are rotatably adjustable in their socket recesses 107 to accurately position the cutting edge of the tool bits carried thereby, set screws 109 being provided for this purpose that engage the body 105 of the tool holder 22 for rotating the same.

While the turret tool has heretofore been described as being mounted upon the compound slide of an engine lathe it will be understood that the turret tool is capable of being mounted upon any support member for positioning the same in the desired work relationship with regard to the spindle of the machine and can also be mounted upon a support member that is coaxial with the axis of the spindle of the machine so as to place the various tool holders carried by the turret tool in coaxial alignment with the axis of the spindle of the machine for producing end operations upon a work piece.

Figures 22, 23, 24:
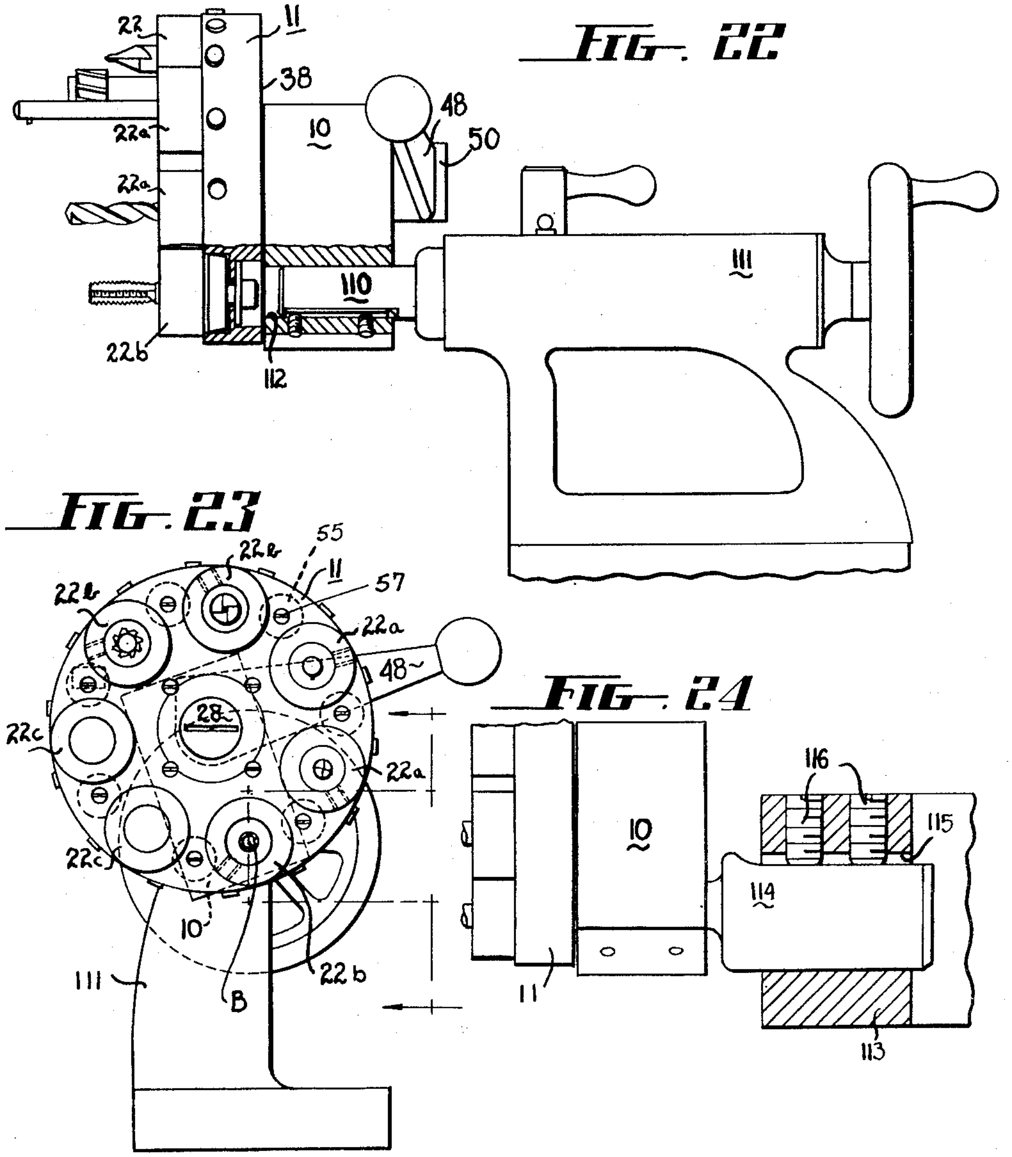
Figure 22 is a side elevational view showing the turret tool partially in cross section and as mounted upon the tailstock of a lathe.
Figure 23 is a front elevational view of the apparatus illustrated in Figure 22.
Figure 24 is an elevational view, partially in cross section, showing means for mounting the turret tool upon a horizontally rotatable turret of a turret lathe.

As illustrated in Figure 22 the tool support block 10 is shown as being mounted upon the spindle 110 of a tailstock 111. The support block 10 is provided with a bore 112 therethrough that is in axial alignment with the axis of a tool holder 22b when the index buttons 55 have been positioned, as illustrated in Figure 5, to locate the axis of the tool holder 22 as illustrated therein. With the axis of the tool holder 22b in axial alignment with the bore 112 it will be apparent that the support block 10 can be mounted upon the tailstock 111 of an engine lathe so as to be able to index all of the tools carried thereby in a regular sequence for producing end operations upon a work piece. Figure 23 illustrates the face view of the apparatus shown in Figure 22 wherein the axis B of the spindle 110 of the tailstock 111 is coaxial with the tool holder 22. It will, of course, be understood that in this instance that all of the index buttons 55 will be positioned as illustrated in Figure 5.

In Figure 24 the turret tool is illustrated as being mounted upon a horizontally rotated turret 113 that is carried upon any conventional turret lathe. In this instance, the support block 10 has a shank 114 extending from the bore previously mentioned therein into a bore 115 provided in the turret 113 of a conventional turret lathe. The member 114 may be secured in the turret 113 by means of set screws 116.

Figure 18:
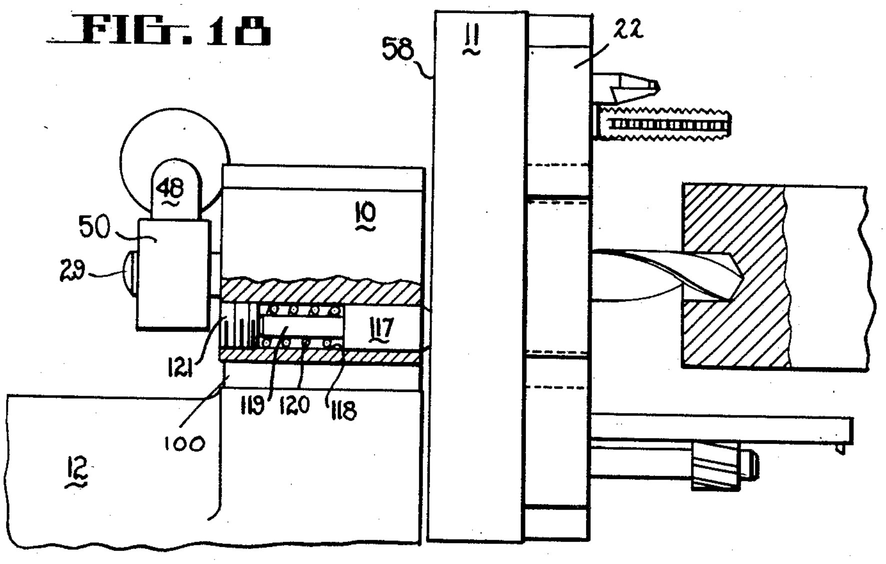
Figure 18 is a side elevational view of the turret tool, showing a thrust supporting bolt in cross section.

In certain work operations, particularly in end operations, such as drilling, there is a substantial thrust produced upon the turret disc 11 tending to rotate the same about a vertical axis, thereby inducing a torque load upon the tapered nose 23 that supports the turret disc 11. To eliminate this torque thrust there is provided a thrust pin 117 positioned in the support block 10 adjacent the tool position that is in work engagement with a work piece, as illustrated in Figures 3 and 18. In Figure 3, it will be noted that the thrust pin 117 is located in the lower left-hand corner of the support block 10 and, therefore, will absorb the thrust of the turret disc 11.

This thrust pin 117 is slidably and reciprocably mounted within a bore 118 positioned at a right angle to the rear face 58 of the turret disc 11. The thrust pin 117 has a tail portion 119 of smaller diameter than the main body of the thrust pin 117. A spring 120 is positioned around the tail portion 119 and is retained between the main body of the thrust pin 117 and a plug 121 that closes one end of the bore 118, the plug 121 being in threaded engagement with the bore 118.

When the turret disc 11 has been pulled back tightly upon the nose member 23 by operation of the handle 48, the tail portion 119 of the thrust pin 117 will be in engagement with the plug 121 while the nose of the thrust pin 117 engages the rear face 58 of the turret disc 11. It will thus be seen that the thrust pin 117 provides a solid support for the turret disc 11 to prevent rotative thrust from being applied upon the nose member 23 of the support block 10.

When the turret disc 11 has been released from the nose member 23 of the support block 10 the rear face 58 of the turret disc 11 will, of course, be positioned at a greater distance from the support block 10, as illustrated in Figure 18, so that at this time the spring 120 will urge the nose of the thrust pin 117 against the rear face 58 of the turret disc 11 so that it will wipe acoss the face 58 when the turret disc is indexed. This arrangement prevents dirt from getting between the thrust pin and the turret disc which would tend to cause a rotative thrust upon the nose member 23 that supports the turret disc when it would be pulled back tightly upon the nose member.

In order to most conveniently use a multiple tool set-up provided by the turret tool it is desirable that the tool bits 103 be adjusted in the tool holders 22a in such a manner that the depth of cut taken by each of the tool bits can be read directly on the gauge of a micrometer feed member 21 of the cross slide 13. The gauge of the micrometer feed member 21 can be set to read at zero from the axis of the spindle of the lathe or the work piece 19. Thus, during the initial tooling set-up for producing a multiplicity of pieces on the lathe the various tool bits will be accurately adjusted to obtain this condition so that each can be fed into the work piece at a predetermined distance by direct reading of the micrometer feed member 21.

The tools for producing end operations, such as those provided in the tool holders 22b will also be preadjusted during the initial tooling set-up so that the depth of the operation can be read from a zero position of the micrometer feed member 20 for the compound slide 12. It is, of course, understood that this tooling set-up is preferably established when it is desired to make a small run of a piece part.

If, after the tool has been once established in a preset condition, and it is necessary to remove any one of the tools from its respective tool holder for grinding and sharpening the same, it will be apparent that it is desirable that the tool shall be returned to identically the same position it previously occupied so that the cutting operation performed by the tool will be identical to that previously performed, and so that the micrometer controls of the compound slide or cross slide can be read directly.

Figures 19, 20, 21:
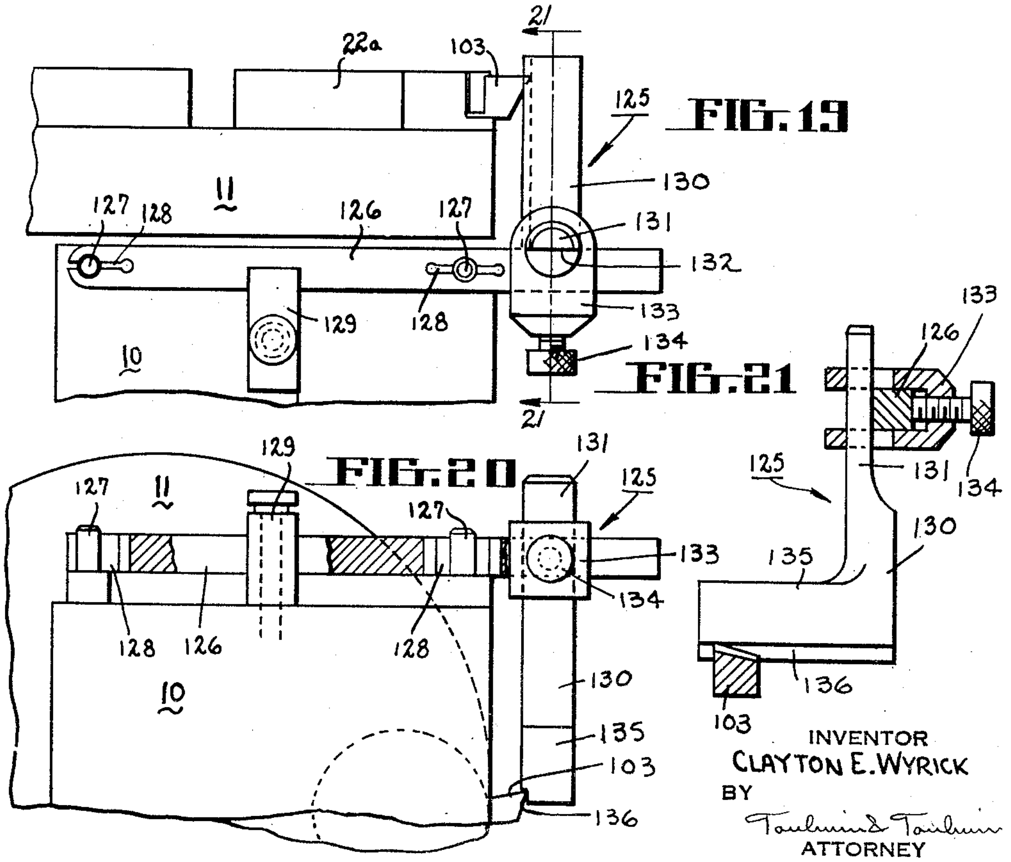
Figure 19 is a plan view of a portion of the turret tool illustrating the use of a gauging device for setting a tool bit in a tool holder carried by the turret.
Figure 20 is an end elevational view of the apparatus illustrated in Figure 19.
Figure 21 is a vertical cross-sectional view of the gauging device taken along line 21—21 of Figure 19.

In order to return tools to the tool holders 22 of the turret disc 11 a comparator gauge 125 is provided in association with the support block 10, as illustrated in Figures 19 to 21. The comparator gauge 125 consists of a square bar 126 that is adapted to be positioned upon a pair of pins 127 that extend upwardly from the support block 10 so as to position the bar 126 in a manner to prevent it from rotation relative to the support block 10. The pins 127 are received in slotted openings 128 in the bar 126 that frictionally engage the pins 127. A clamp member 129 extends over the bar 126 for securing the same upon the support block 10 in the manner as illustrated in Figure 20.

The bar 126 carries a gauge member 130 that is provided with a half-round shank 131. The flat face 132 of the half-round shank 131 engages the vertical flat face of the bar 126, and a clamp member 133 having a tightening screw 134 secures the half-round shank against the bar 126 as illustrated in Figure 21.

The gauge member 130 has an angular portion 135 extending from the shank 131 that is provided with a right angle ledge 136 in the lower corner thereof as illustrated in Figure 20.

When a tool bit is to be removed from one of the tool holders the comparator gauge 125 will be positioned as illustrated in Figures 19 and 20 so that the cutting edge of the tool bit 103 is positioned in the corner of the right angle ledge 136 thereby locating the right angle ledge for determining the extension of the tool bit 103 as well as the position of the cutting edge relative to the horizontal plane through the axis of the spindle of the lathe. The tool bit can now be removed from the tool holder 22*a* for grinding and be returned to the tool holder with the cutting edge of the reground tool in exactly the same position the cutting edge occupied before it was removed from the tool holder 22*a*.

If it is desired, the comparator gauge 125 can be used to determine the extension of a tool for producing end operations when the tool has been removed from a tool holder and returned after being sharpened. For this purpose the gauge bar 126 may be rotated upon the pin 127*a* so that it will extend at a right angle to the position as illustrated in Figure 19 whereby the gauge member 130 will be positioned adjacent the face of one of the tool holders 22. The clamp member 129 may be sufficiently long as to extend over the gauge bar 126 when in this position. It will be understood, of course, that the gauge bar 126 will have sufficient length to permit this latter operation of the same.

While the gauge bar 126 has been illustrated for the specific purpose of setting the tools carried by the tool holders 22, it will be understood that other indicating instruments can be placed upon the gauge bar 126 for suitable indicating operations upon a work piece that is being produced.

Figures 25, 26:
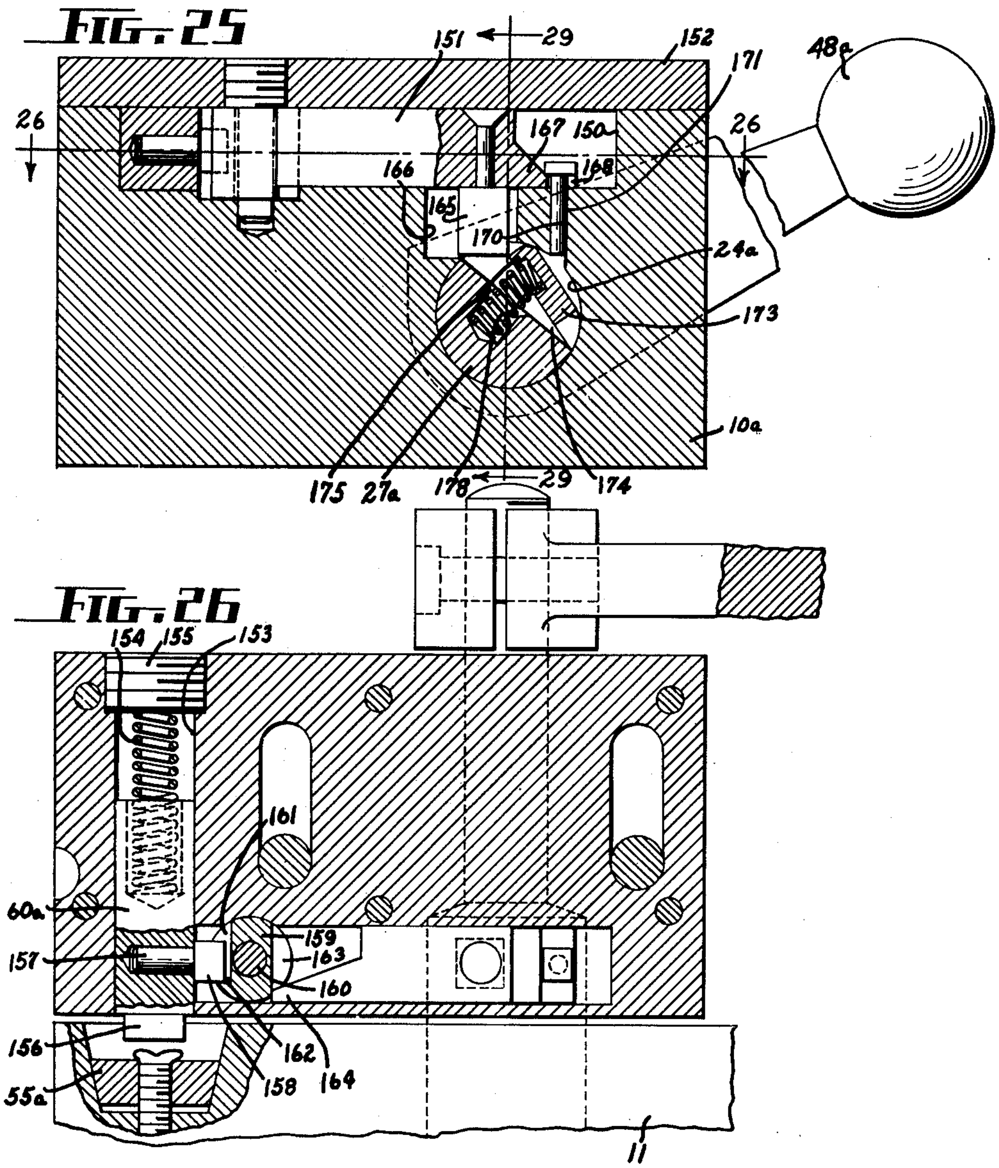
Figure 25 is a vertical cross-sectional view through a modified structure of the index bolt operating mechanism.
Figure 26 is a horizontal cross-sectional view of the index bolt operating mechanism illustrated in Figure 25, and is taken substantially along line 26—26 of Figure 25.
Figure 27:
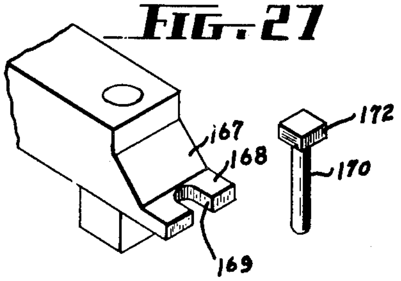
Figure 27 is a perspective elevational view of one end of the index bolt operating member and a cooperating lock out pin.

In Figures 25 and 26 there is illustrated a modified structure for the index bolt releasing mechanism. The support block 10*a* is provided with a substantially square recess 150 that receives a square actuating bolt 151. A cover plate 152 retains the actuating bolt 151 in the recess 150.

The index bolt 60*a* slides within a recess 153 provided at right angles to the recess 150. The index bolt 60*a* is urged outwardly of the recess 153 by means of a spring 154 retained between the plug 155 and the index bolt 60*a*. The forward end of the index bolt 60*a* is provided with a nose 156 that engages the index button 55*a* for positioning the turret after indexing the turret 11 in the manner heretofore referred to.

The index bolt 60*a* carries a pin 157 having a head 158 extending therefrom that is engaged by a rotatable actuator 159.

The actuator 159 is generally cylindrical in form and is rotatable upon the pin 160. The actuator 159 has a recess 161 in one side thereof that forms a ledge 162 that engages the head 158 of the pin 157 and thereby moves the index bolt 60*a* upon rotation of the actuator 159. The actuator 159 is provided with a recess 163 in the opposite side thereof relative to the recess 161 that is engaged by the nose 164 of the actuating bolt 151.

The actuating bolt 151 carries a pin 165 on the bottom face thereof that moves within a recess 166 provided in the support member 10*a* adjacent the bore 24*a* that extends through the support block 10*a* to carry the shaft 27*a* to which the actuating handle 48*a* is secured in a manner heretofore described.

The heel 167 of the actuating bolt 151 is provided with a thin tail section 168 that has a groove 169 therein adapted to receive the shank of a pin 170 that is slidable in a bore 171 provided in the support block 10*a*. The pin 170 has a head 172 on the upper end thereof adapted to rest upon the heel section 168 of the actuating bolt 151 when the indexing bolt 60*a* is in engagement with the index button 55*a* in the manner illustrated in the drawings.

The actuating bolt 151 is operated by a trip member 173 positioned in a recess 174 provided transversely in the shaft 27*a*. The trip member 173 has a nose 175 for engaging the pin 165 to operate the actuating bolt 151. The heel of the trip member 173 is provided with extending lugs 176 that are carried in the recesses 177 extending longitudinally from the recess 174 to thereby position the lugs 176 between the shaft 27*a* and the internal surface of the bore 24 to hold the trip member 173 in position in the recess 174.

A spring 178 is positioned between the shaft 27*a* and the trip member 173 to hold the nose of the trip member against the periphery of the bore 24*a*.

The operation of the modified structure heretofore referred to is similar to the operation of the index bolt releasing mechanism heretofore disclosed and described with regard to Figures 9 to 13 inclusive insofar as the specific movements are involved for releasing the index bolt as one of a series of events during operation of the turret 11.

When the actuating handle 48*a* is rotated in a counter clockwise direction, see Figure 25, the trip member 173 engages the pin 165 to advance the actuating bolt 151 in a leftward direction. This movement of the actuating bolt 151 rotates the actuator 159 in a clockwise direction, see Figure 26, to move the pin 157 in an upward direction and thus move the index bolt 60*a* to remove the same from the index button 55*a*.

When the actuating bolt 151 moves in a leftward direction, the pin 170 drops down so that the heel portion 168 of the actuating bolt engages the head 172 of the pin 170 and thereby prevents return of the actuating bolt 151 until a later operation of the indexing cycle of the turret 11 and thereby retains the index bolt 60*a* out of engagement with the turret 11.

When the indexing of the turret is about complete, the heel of the trip member 173 will raise the pin 170 to release the actuating bolt 151 and permit the spring 154 to move the index bolt 60*a* into engagement with the rear face of the turret 11 so that when the next indexing button 55*a* approaches the indexing bolt 60*a*, the index bolt will drop into the slot provided in the index button and stop the turret.

The handle 48*a* is then rotated in a clockwise direction to tighten the turret upon the support member 10 in the manner heretofore described.

Figure 31:
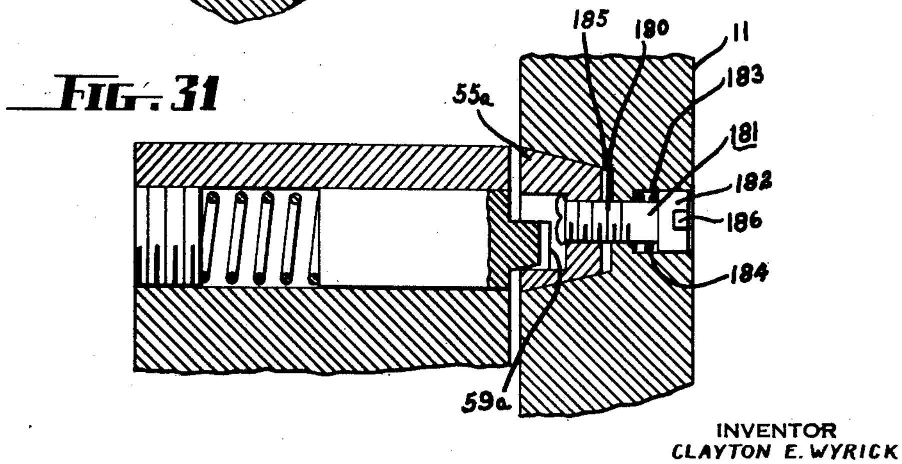
Figure 31 is a vertical cross-sectional view through a modified structure of the index button carried in the turret.

In Figure 31 there is illustrated a modified structure of the index button 55a wherein the index button is threaded upon the threaded shank 180 of a pivot pin 181. The pivot pin 181 has a head 182 that enters a bore 183 in the turret 11, a spring 184 being retained in the head 182 of the pivot pin 181 and the bottom of the recess 183 to retain the tapered side wall of the index button 55a in engagement with the tapered wall of the recess 185 that receives the index button 55a. The end of the shank 180 is staked over to prevent rotation of the shank 180 relative to the index button 55a. A conventional screw driver slot is provided in the head 182 of the pin 181.

With the construction illustrated in Figure 31 the index button 55a can be changed from one position to the other for positioning the tools upon indexing of the turret in the manner heretofore described merely by inserting a screw driver in the screw driver slot 186 and pushing inwardly against the spring 184 while simultaneously rotating the pin 181 to accordingly reposition the index button 55a having the slot 59a therein.

Figure 4:
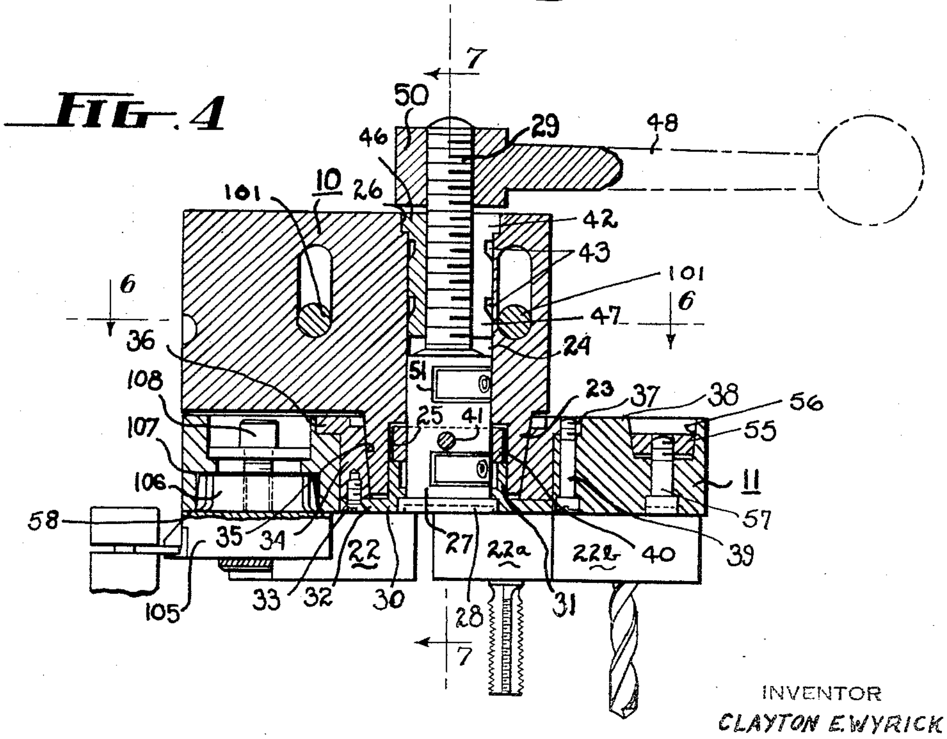
Figure 4 is a horizontal cross sectional view taken along line 4—4 of Figure 3.
Figures 28, 29, 30:
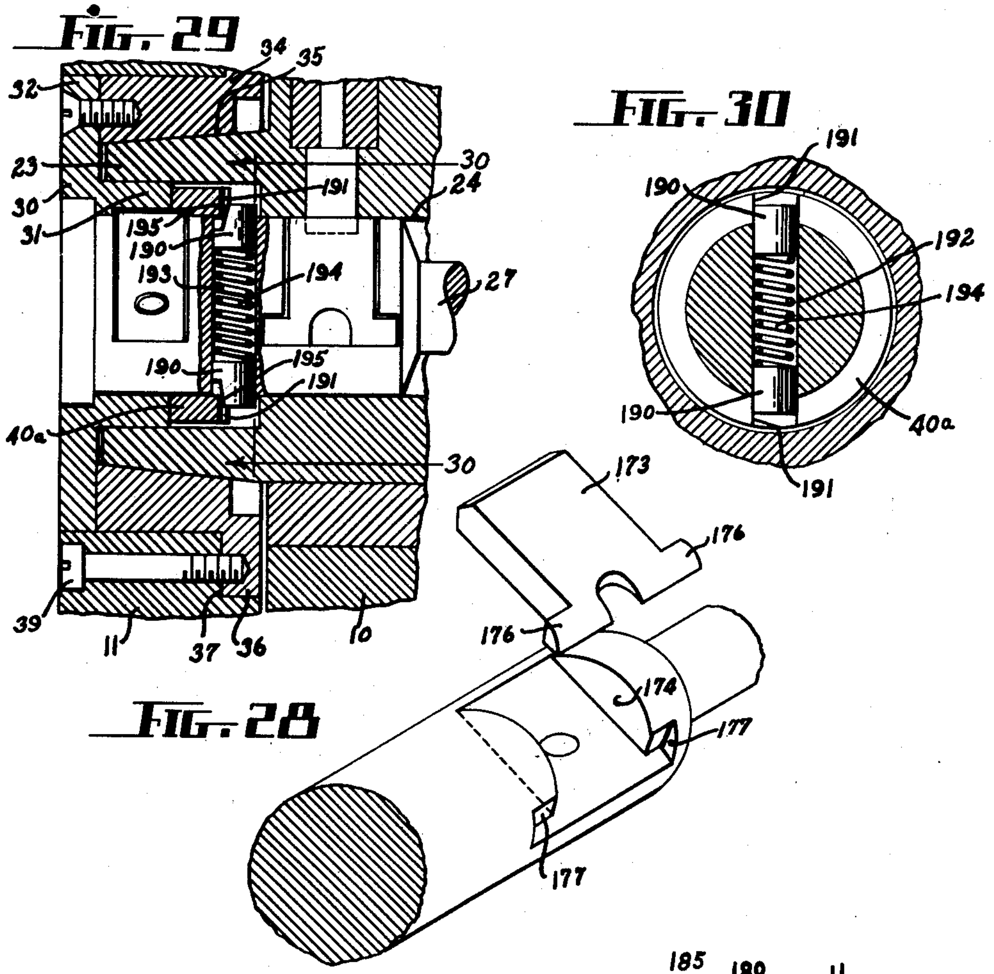
Figure 28 is a perspective elevational view showing the detailed construction of the trip lever that operates the index bolt operating mechanism.
Figure 29 is a vertical cross-sectional view of a modified structure of the turret releasing mechanism taken substantially along line 29—29 of Figure 25.
Figure 30 is a cross-sectional view taken substantially along line 30—30 of Figure 29.

In Figure 29 there is illustrated a slightly modified structure of the means for releasing the turret 11 from the support block 10 wherein means is provided for continuously maintaining a positive position of the turret releasing ring against the hub of the turret. In this modification the elements of the device that are identical in construction with that heretofore described with regard to Figures 4 and 7 bear the same reference numerals.

As heretofore described, the ring 40 engages the hub 30 to urge the tapered surface 35 off of the tapered nose 23 on the support member 10. However in the previous described construction, a pin 41 is provided to secure the ring 40 to the shaft 27. Wear can occur between the ring 40 and the hub 30 so that after a certain period of operation a greater movement of the handle 48 would be required to release the turret 11 from the nose 23 of the support member 10.

To overcome any such difficulty, the structure of the device disclosed in Figure 29 is provided with a loose ring 40a that is movable axially upon the shaft 27, but is prevented from rotation relative to the shaft 27 by means of the retaining members 190 that engage recesses 191 in the rear face of the ring 40a extending radially of the ring. The retaining members 190 are positioned in a bore 192 extending transversely of the shaft 27, a spring 194 being positioned between the retaining members 190 to constantly urge them outwardly of the bore 193. The retaining members 190 are each provided with a tapered surface 195 that engages the rear edge of the ring 40a to constantly urge the ring 40a into engagement with the boss 31 of the hub 30 on the turret 11. The tapered surfaces 195 are disposed at a proper angle that will prevent a rightward movement of the ring 40a, and thus play between the ring 40a and the hub 30 is eliminated, and the tapered surface 35 in the hub 34 will be released from the tapered nose 23 on the support member 10 at the proper time in the cycle of indexing of the turret.

While the apparatus disclosed and described herein constitutes a preferred form of the invention, yet it will be understood that the apparatus is capable of modification without departing from the spirit of the invention, and that such modifications as fall within the scope of the appended claims are intended to be included herein.

Having thus fully described my invention what I claim as new and desire to secure by Letters Patent is:

1. In a machine tool, a support member, a turret rotatably mounted upon said support member, means for rotating said turret, latch bolt means extending from said support member into engagement with said turret to stop the same upon indexing rotation thereof, and an actuating mechanism in said support for said latch means including an oscillatable member engaging said latch bolt member for reciprocation thereof, a reciprocable member for actuating said oscillatable member, a trip lever carried by said means for rotating said turret for actuating said reciprocable member, and a swingable lever carried by said reciprocable member engageable with a stop means to lock said latch bolt in unlatched position upon movement of said reciprocable member in one direction by said trip lever, said trip lever having means engaging said swingable lever after a determined movement of said trip lever whereby to release said swingable lever from said stop means to permit return movement of said reciprocable member and latching movement of said latch bolt.

2. In a machine tool, a support member, a turret rotatably mounted upon said support member, rotatable shaft means engaging said turret for rotating the same, latch bolt means extending from said support member into engagement with said turret to stop the same upon indexing rotation thereof, and an actuating mechanism in said support for said latch means including an oscillatable member engaging said latch bolt member for reciprocation thereof, a reciprocable member for actuating said oscillatable member extending transversely of said shaft means, a recess in said shaft means in alignment with said reciprocable member, a trip lever in said recess engageable with said reciprocable member for moving the same upon rotation of said shaft means to rotate said oscillatable member and unlatch said bolt means, and a swingable lever carried by said reciprocable member engageable with a stop means upon said movement of said reciprocable member to lock said latch bolt in unlatched position, said trip lever engaging said swingable lever upon a determined rotation thereof by said shaft means to release the swingable lever from said stop means whereby to permit latching movement of said bolt means.

3. A machine tool including, a support member, a turret, means rotatably supporting said turret upon said support member, an axial recess in said turret, shaft means extending axially through said turret for rotating the same, a plurality of recesses in the periphery of said axial recess equal to the number of tool places on said turret, a recess in said shaft means, a trip lever in said shaft recess for engaging the recesses in the periphery of said axial recess whereby to rotate said turret upon rotation of said shaft means, latch bolt means extending from said support member into engagement with said turret to stop the same upon indexing rotation thereof, and an actuating mechanism in said support for said latch means including an oscillatable member engaging said latch bolt member for reciprocation thereof, a reciprocable member for actuating said oscillatable member extending transversely of said shaft means, a recess in said shaft means in alignment with said reciprocable member, a trip lever in said recess engageable with said reciprocable member for moving the same upon rotation of said shaft means to rotate said oscillatable member and unlatch said bolt means, said second mentioned trip lever means being positioned relative to said first mentioned trip lever means to actuate said bolt means before said first mentioned trip lever means indexes said turret.

4. In a machine tool the combination that includes, a support member, a nose member extending from said support member having an external conical surface, a turret having a conical recess co-operating with said nose member to provide a sticking taper for securing said turret from rotation when positioned in engagement with said nose member, shaft means extending axially through said turret and through said support member, stationarily mounted means in said support member engaging threaded means on said shaft for producing axial movement of said shaft upon rotation thereof, means on said shaft means engaging said turret to move the same axially with said shaft means upon axial movement thereof, latch bolt means extending from said support into engagement with said turret to prevent rotation thereof, means for actuating said latch bolt means, means carried by said shaft means for actuating said actuating means upon rotation of said shaft means, and means carried by said shaft means engaging said turret to produce indexing rotation thereof upon rotation of shaft means, said latch bolt actuating means and said indexing means on said shaft means being positioned relative to one another whereby upon rotation of said shaft means initial rotation thereof produces axial motion of said shaft to release said turret from said nose and actuate said bolt to unlatch the same and subsequent rotation of said shaft causes engagement of said indexing means with said turret for indexing the same.

5. In a machine tool the combination that includes, a support member, a nose member extending from said support member having an external conical surface, a turret having a conical recess co-operating with said nose member to provide a sticking taper for securing said turret from rotation when positioned in engagement with said nose member, shaft means extending axially through said turret and through said support member, stationarily mounted means in said support member engaging threaded means on said shaft for producing axial movement of said shaft upon rotation thereof, means on said shaft means engaging said turret to move the same axially with said shaft means upon axial movement thereof, latch bolt means extending from said support into engagement with said turret to prevent rotation thereof, means for actuating said latch bolt means, a recess in said shaft, trip lever means in said recess for actuating said latch bolt actuating means upon rotation of said shaft, a plurality of recesses in said turret around the periphery of said shaft equal to the number of tool places on said turret, a second recess in said shaft, and a second trip lever means in said second recess for engaging said recesses in said turret upon rotation of said shaft, said trip levers and the means engaged thereby being positioned so that initial rotation of said shaft means produces axial movement of said turret to release the same from said nose and produces actuation of said latch bolt and unlatching the same, and subsequent rotation of said shaft causes said second mentioned trip lever means to engage the recesses in said turret to produce indexing rotation thereof.

6. In a machine tool, a support member, a turret rotatably mounted upon said support member, means for rotating said turret, latch bolt means extending from said support member into engagement with said turret to stop the same upon indexing rotation thereof, and an actuating mechanism in said support for operating said latch bolt means including an oscillatable member engaging said latch bolt for reciprocating the same, a reciprocable member engaging said oscillatable member for actuating the same, a trip lever carried by said means for rotating said turret for actuating said reciprocable member, and a lock out pin movable in said support member having a part thereof engaging said reciprocable member for dropping into position behind said reciprocable member to lock said latch bolt in unlatched position upon movement of said reciprocable member in one direction as caused by said trip lever.

7. In a machine tool, a support member, a turret rotatably mounted upon said support member, means for rotating said turret, latch bolt means extending from said support member into engagement with said turret to stop the same upon indexing rotation thereof, and an actuating mechanism in said support for operating said latch bolt means including an oscillatable member engaging said latch bolt for reciprocating the same, a reciprocable member engaging said oscillatable member for actuating the same, a trip lever carried by said means for rotating said turret for actuating said reciprocable member, and a lock out pin movable in said support member for dropping into position behind said reciprocable member to lock said latch bolt in unlatched position upon movement of said reciprocable member in one direction as caused by said trip lever, said trip lever having means engaging said lock out pin to raise the same relative to said reciprocable member upon a determined movement of said trip lever to release said reciprocable member and permit return movement of said reciprocable member and latching movement of said latch bolt.

CLAYTON EARL WYRICK.

REFERENCES CITED

The following references are of record in the file of this patent:

UNITED STATES PATENTS

| Number | Name | Date |
|---|---|---|
| 938,156 | Libby | Oct. 26, 1909 |
| 1,466,365 | Balsam | Aug. 28, 1923 |
| 1,497,307 | Schneider | June 10, 1924 |
| 1,515,591 | Canner | Nov. 18, 1924 |
| 1,518,156 | Libert | Dec. 9, 1924 |
| 1,664,851 | Class | Apr. 3, 1928 |
| 2,094,993 | Lovely et al. | Oct. 5, 1937 |
| 2,105,962 | Bickel | Jan. 18, 1938 |
| 2,148,779 | Senger | Feb. 28, 1939 |
| 2,344,509 | Guenther | Mar. 21, 1944 |
| 2,368,736 | Wyrick | Feb. 6, 1945 |
| 2,369,209 | Bullard et al. | Feb. 13, 1945 |
| 2,371,014 | Zuellig | Mar. 6, 1945 |
| 2,375,114 | Kylin | May 1, 1945 |
| 2,433,026 | Casella | Dec. 23, 1947 |

FOREIGN PATENTS

| Number | Country | Date |
|---|---|---|
| 28,998 | Great Britain | Feb. 28, 1907 |